United States Patent
Jones

(10) Patent No.: US 6,172,484 B1
(45) Date of Patent: Jan. 9, 2001

(54) METHOD AND APPARATUS FOR CONTROLLING A HIGH-CURRENT LOAD WITH A SELF-POWERED CONTACTOR

(75) Inventor: Thaddeus M. Jones, Bremen, IN (US)

(73) Assignee: MSX, Inc., South Bend, IN (US)

( * ) Notice: Under 35 U.S.C. 154(b), the term of this patent shall be extended for 0 days.

(21) Appl. No.: 09/430,662

(22) Filed: Oct. 29, 1999

(51) Int. Cl.[7] .................................................. H02J 7/00
(52) U.S. Cl. .................................... 320/135; 307/117
(58) Field of Search ............................ 363/84, 89, 125, 363/126; 307/117, 118, 116, 141

(56) References Cited

U.S. PATENT DOCUMENTS

| | | | | |
|---|---|---|---|---|
| 4,336,463 | * | 6/1982 | Beeghly | 307/116 |
| 4,365,167 | * | 12/1982 | Weimer et al. | 307/66 |
| 5,023,529 | * | 6/1991 | Tennant | 318/266 |
| 5,306,955 | * | 4/1994 | Fryer | 307/116 |
| 5,523,547 | * | 6/1996 | Miller | 219/202 |
| 5,682,748 | * | 11/1997 | DeVilbiss et al. | 62/3.7 |
| 5,825,233 | * | 10/1998 | Lamarche | 327/365 |
| 5,889,466 | * | 3/1999 | Ferguson | 307/117 |

* cited by examiner

Primary Examiner—Peter S. Wong
Assistant Examiner—Pia Tibbits
(74) Attorney, Agent, or Firm—Taylor & Aust, P.C.

(57) ABSTRACT

A method of controlling a load dependent upon at least one predetermined condition includes determining a presence of the at least one predetermined condition with at least one sensor. A signal is transmitted from the at least one sensor to an electrical processor dependent upon whether the at least one predetermined condition is present. A switch device is controlled with the electrical processor dependent upon the signal from the at least one sensor. The switch device has a first state in which the switch device connects a power source to the load, and a second state in which the switch device connects the power source to the at least one sensor, to the electrical processor and to a rechargeable energy storage device. If the predetermined condition is not present, the switch device is maintained in the second state. If the predetermined condition is present, the switch device is cyclically and continuously switched between the first state and the second state. The cyclical switching occurs at at least one predetermined frequency. The rechargeable energy storage device temporarily supplies power to each of the at least one sensor and the electrical processor when the switch device is in the first state. The power source recharges the rechargeable energy storage device when the switch device is in the second state.

16 Claims, 2 Drawing Sheets

METHOD AND APPARATUS FOR CONTROLLING A HIGH-CURRENT LOAD WITH A SELF-POWERED CONTACTOR

BACKGROUND OF THE INVENTION

1. Field of the Invention

The present invention relates to a method of controlling a high-current load, and, more particularly, to a method of controlling a high-current load dependent upon at least one predetermined condition.

2. Description of the Related Art

Power can be applied to a load upon the presence of a predetermined condition using a so-called "two wire" connection. In a two wire control system, a same power source supplies power to both the load and a control circuit which includes a sensor for determining the presence of the predetermined condition. Power is cyclically switched between the load and the control circuitry via a switch controlled by the control circuitry. In order to maintain operation of the sensor and other electronics while power is being diverted to the load, the control circuitry includes an electrical energy storage device which stores enough electrical energy to maintain operation of the sensor and the associated electronics while power is being diverted to the load. In order to ensure that the voltage level supplied by the storage circuit does not drop below a minimum level required for operation of the sensor and the electronics, the voltage output by the storage circuit is continuously monitored. When this storage circuit voltage falls below a predetermined level, power is diverted back to the control circuitry from the load in order to replenish the storage circuit. When the storage circuit voltage has reached a predetermined target voltage, the power source can again be connected to the load while the electrical energy stored in the storage circuit is used to operate the control circuitry.

A problem is that monitoring the voltage output from the storage circuit adds to the complexity and expense of the control circuitry. In cases where the storage circuit output voltage declines with time in a repeatable and predictable manner, the monitoring of this storage circuit output voltage represents a waste of resources. Also, if the circuitry which monitors the storage circuit output voltage is damaged or otherwise inoperable, it is possible for either the load or the control circuitry to lose power.

What is needed in the art is a method of maintaining a minimum level of electrical energy within a storage circuit while a power source is being diverted to a load, such that monitoring of the voltage output of the storage circuit is not required.

SUMMARY OF THE INVENTION

The present invention provides a method of cyclically replenishing the electrical energy stored within a storage circuit at a fixed frequency so that the storage circuit can maintain operation of sensor circuitry while power is being diverted to a load.

The invention comprises, in one form thereof, a method of controlling a load dependent upon at least one predetermined condition. The method includes determining a presence of the at least one predetermined condition with at least one sensor. A signal is transmitted from the at least one sensor to an electrical processor dependent upon whether the at least one predetermined condition is present. A switch device is controlled with the electrical processor dependent upon the signal from the at least one sensor. The switch device has a first state in which the switch device connects a power source to the load, and a second state in which the switch device connects the power source to the at least one sensor, to the electrical processor and to a rechargeable energy storage device. If the predetermined condition is not present, the switch device is maintained in the second state. If the predetermined condition is present, the switch device is cyclically switched between the first state and the second state. The cyclical switching occurs at at least one predetermined frequency. The rechargeable energy storage device temporarily supplies power to each of the at least one sensor and the electrical processor when the switch device is in the first state. The power source recharges the rechargeable energy storage device when the switch device is in the second state.

An advantage of the present invention is that monitoring of the voltage output of a storage circuit, and the electronic circuitry required for performing such monitoring, are not necessary, thereby decreasing the cost and complexity of the control circuitry.

Another advantage is that the reliability of the control circuitry is improved since the function of controlling the switching of power to the storage circuit is performed within an integrated circuit.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

The exemplifications set out herein illustrate one preferred embodiment of the invention, in one form, and such exemplifications are not to be construed as limiting the scope of the invention in any manner.

DETAILED DESCRIPTION OF THE INVENTION

Figure 1:
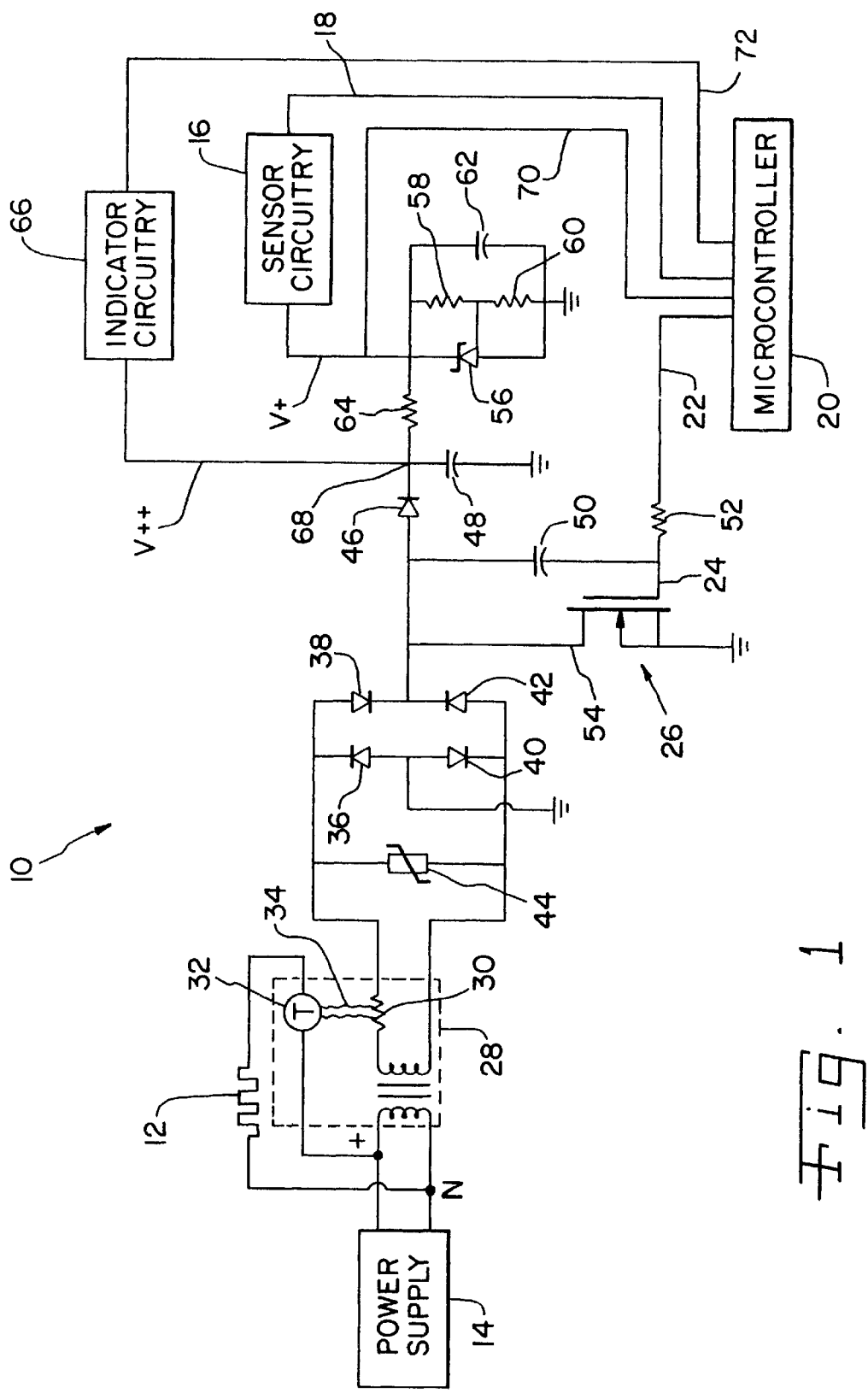
FIG. 1 is a schematic diagram of the power supply, load and control circuitry which may be used in one embodiment of the method of the present invention.

The present invention includes a method of maintaining the output voltage of a storage circuit above a predetermined voltage level such that the storage circuit may maintain operation of sensor and control circuitry while a power source is being diverted to a load. Referring now to the drawings and more particularly to FIG. 1, there is shown a sensor and control circuit 10 which controls application of power to a load 12 from an alternating current power supply 14. Load 12 is shown as being a resistance heater, but the method of the present invention can also be used to control any other type of load 12 which draws a high level of current.

Sensor circuitry 16 is used to sense at least one predetermined condition under which heater 12 should be operated. For example, sensor circuitry 16 may include a temperature sensor and/or a moisture sensor for sensing an ambient temperature and/or the presence of precipitation. If the ambient temperature is below a predetermined level and/or precipitation such as snow or rain is present, then operation of heater 12 may be needed to dry and/or defrost a walkway or a reflecting surface of a satellite dish, for example. Upon detecting the presence of the predetermined condition, sensor circuitry 16 sends a signal on line 18 to microcontroller 20.

Upon receiving this signal on line 18, microcontroller 20 then transmits a voltage on line 22 to gate 24 of MOSFET 26 to cause thermal contactor 28 to interconnect power supply 14 and load 12, as will be discussed in more detail herein.

Thermal contactor 28 is self-powered and includes a heater 30 attached to an electrical thermostat 32. Heat, indicated at 34, generated while passing electrical current through heater 30, causes thermostat 32 to close its contacts (not shown), thereby interconnecting power supply 14 and load 12. The contacts within thermostat 32 close when an internal temperature within thermostat 32 is above a predetermined temperature. Conversely, the contacts within thermostat 32 open when the internal temperature within thermostat 32 is below a second predetermined temperature, which may or may not be equal to the first predetermined temperature. The use of thermostat 32 is a very low cost method of controlling the large electric currents required by heater 12.

Heater 30 of thermal contactor 28 requires a current that is large by electronic standards but very small by electrical standards. Thus, it is possible to operate electronic circuits from the current passing through heater 30 providing that the following three conditions are satisfied: first, the current flowing through heater 30 to operate the electronics must be small enough that it produces a negligible amount of heat 34, and thus does not alter the turn on or turn off characteristics of contactor 28; second, the electronic circuits must operate from internally stored energy in a storage device such as a capacitor for about one second of time; and third, thermal contactor 28 must take several seconds or more to respond to a change in the power dissipated by heater 30.

As indicated above, enhancement mode field effect transistor 26 controls the current through heater 30 of contactor 28. Diodes 36, 38, 40 and 42 form a full wave bridge rectifier. A metal oxide varistor (MOV) 44 limits electrical transients to a safe value. Otherwise, such electrical transients could damage diodes 36, 38, 40 and 42 of the bridge rectifier. The bridge rectifier prevents reverse biasing of MOSFET 26. A diode 46 prevents discharging filter capacitor 48 when MOSFET 26 turns on and allows current to pass to ground.

While there is no call for heat, MOSFET 26 remains off, thus reducing the current through heater 30 to a minimum value required for operation of circuitry 10. If thermal contactor 28 is on at a point in time when sensor circuitry 16 indicates that there is no need for heat, then thermal contactor 28 turns off, thereby opening the contacts within thermostat 32. If thermal contactor is off when sensor circuitry 16 determines there is no need for heat, then thermal contactor 28 remains off.

While sensor 16 indicates to microcontroller 20 that there is a need for heat, MOSFET 26 conducts current for a majority of the time, thus increasing the current through heater 30 to a maximum value. If thermal contactor 28 is off when sensor circuitry 16 indicates a need for heat, then thermal contactor 28 turns on. If thermal contactor 28 is on when sensor circuitry 16 indicates the need for heat, then thermal contactor 28 remains turned on.

An RC network including a capacitor 50 and a resistor 52 limits the time rate of change of the drain voltage at drain 54 of MOSFET 26. This eliminates turn on and turn off transients that would otherwise cause objectionable electromagnetic interference.

Capacitor 48 serves two purposes. First, it stores the electrical energy required to operate circuitry 10 while MOSFET 26 is on. Second, capacitor 48 filters the pulsating direct current outputted from the bridge rectifier while MOSFET 26 is off.

A programmable voltage reference 56 is connected as a shunt regulator and supplies a power supply voltage V+. The values of resistors 58 and 60 set the value of power supply voltage V+. A capacitor 62 reduces the output impedance of voltage reference 56 at higher audio and supersonic frequencies. A resistor 64 provides the operating current for the electronic circuits and sets the bias current limits for voltage reference 56. Resistor 64 and voltage reference 56 cooperate to regulate a discharge current of capacitor 48 to a substantially constant level while MOSFET 26 is diverting power to load 12.

Indicator circuitry 66 provides status information, and may include light emitting diodes which operate to show that supply power is available or that sensor circuitry 16 is calling for heat. Indicator circuitry 66 operates from an unregulated voltage V++ appearing at an anode 68 of capacitor 48. A plot of V++ versus time is shown in the upper portion of FIG. 2. V++ varies after a call for heat at time $t_h$ due to operation of MOSFET 26 and the resultant discharging of capacitor 48. A maximum value of voltage V++ occurs an instant before MOSFET 26 turns on and thereby diverts power to heater 12, such as at time $t_1$. A minimum value of voltage V++ occurs at an instant before MOSFET 26 turns off and starts to replenish capacitor 48, such as at time $t_2$.

Figure 2:
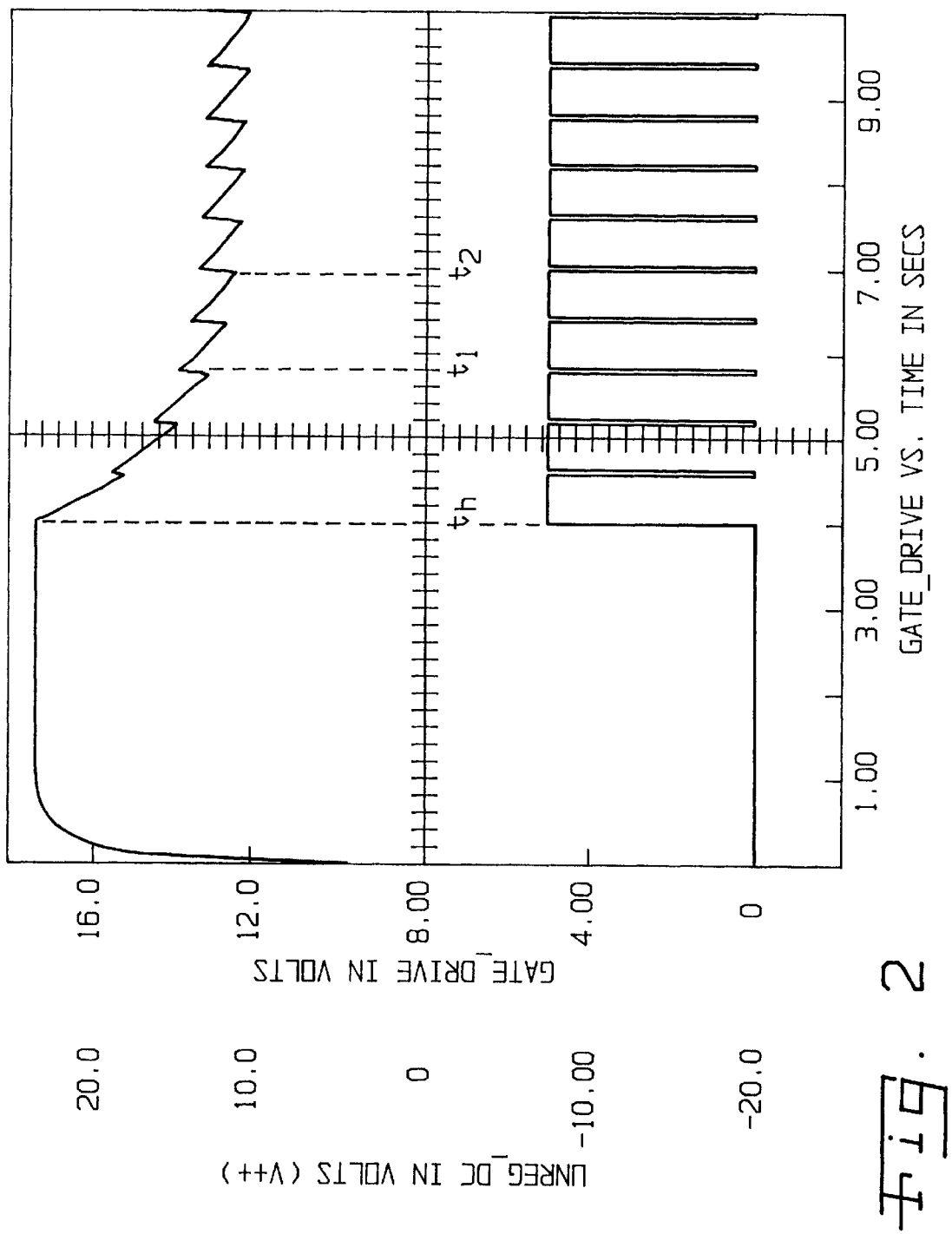
FIG. 2 is a plot of both the output voltage of the storage circuit and the voltage at the gate of a switching transistor of the control circuitry of FIG. 1 versus time.

The lower portion of FIG. 2 is a plot of the voltage at gate 24 of MOSFET 26 as controlled by microcontroller 20. At time $t_h$, when sensor circuitry 16 first indicates a need for heat, microcontroller 20 applies approximately 5 volts to gate 24. MOSFET 26 then switches power from circuitry 10 to heater 12, thereby calling on capacitor 48 to supply power to circuitry 10. As the electrical energy in capacitor 48 is depleted, voltage V++ can be seen to drop in the upper portion of FIG. 2. The voltage at gate 24 is maintained by microcontroller 20 for approximately 0.57 second after time $t_h$, during which time voltage V++ continues to drop.

Microcontroller 20 then removes voltage from gate 24 for approximately 0.03 second, during which time MOSFET 26 switches power back to circuitry 10. Voltage V++ rises sharply during this 0.03 second interval, as capacitor 48 is replenished. Microcontroller 20 then reapplies voltage at gate 24, and this cycling continues so long as sensor circuitry 16 indicates that heat is needed from heater 12. The frequency and duty cycle of the signal that microcontroller 20 transmits to gate 24 is independent of all other voltage levels and current levels outside of microcontroller 20 in circuitry 10.

As is evident from the upper portion of FIG. 2, the local maximum and local minimum values of voltage V++ reach steady state values in the time generally after $t_2$. Thus, capacitor 48 may supply power to circuitry 10 indefinitely during the time intervals in which MOSFET 26 switches power to heater 12. That is, capacitor 48 may supply power to circuitry 10 for the entire duration that sensor circuitry 16 calls for heat, regardless of the length of that duration.

While sensor circuitry 16 calls for heat, the ratio of the time in which MOSFET 26 applies power to heater 12 to the time in which MOSFET 26 applies power to circuitry 10 can be seen in the lower portion of FIG. 2 to be approximately 0.57 to 0.03, or 19 to 1. However, this ratio can have a wide range of values, such as between 10 to 1 and 30 to 1. As can also be determined from the lower portion of FIG. 2, MOSFET 26 switches with a frequency of approximately 1.67 Hz, i.e., the period of a cycle is 0.6 second. However, this frequency can also have a wide range, such as between 0.5 Hz and 5 Hz.

The above-mentioned ratio, which is commonly referred to as a "duty cycle," and the frequency of the switching can be preset in microcontroller 20 such that voltage V++ does not fall below a minimum predetermined voltage necessary to operate circuitry 10. The frequency and duty cycle must also be selected such that heater 30 does not cool off during the replenishing of capacitor 48 to such a degree that the contacts of thermostat 32 open up and remove power from load 12. That is, the thermal inertia of contactor 28 must ensure that the contacts within thermostat 32 remain closed during both the charge and discharge time intervals of capacitor 48. Thus, if sensor circuitry 16 does not call for heat, then MOSFET 26 remains off and power supply 14 is not connected to load 12. However, if sensor circuitry 16 is calling for heat and microcontroller 20 is causing MOSFET 26 to cycle, then power supply 14 is connected to both load 12 and circuitry 10 during the short time intervals when MOSFET 26 is switched off. When sensor circuitry 16 indicates that heat is no longer needed, microcontroller 20 turns MOSFET 26 off, causing heater 30 to cool off to the point where the contacts in thermostat 32 open, thereby removing power from load 12.

The current consumed by circuitry 10 is a known reproducible function of V++. In turn, V++ is a known cyclic function of time. The maximum value of V++ occurs while there is no call for heat and MOSFET 26 is not cycling. While there is a call for heat, V++ assumes its minimum value at the instant that MOSFET 26 turns off, and V++ assumes its maximum value at the instant that MOSFET 26 turns on. Thus, each pulse period as a function of time can be determined from a look-up table in the firmware of microcontroller 20.

Microcontroller 20 sets the duty cycle and period of the signal applied to gate 24 using an internal clock. The internal clock must be calibrated in order to compensate for component tolerances.

Microcontroller 20 is powered by V+ on line 70. Microcontroller 20 uses line 72 to turn on indicator circuitry 66 and to relay to indicator circuitry 66 that sensor circuitry 16 has called for heat. Line 72 may include two separate conductors, each dedicated to a separate one of these two functions.

The present invention has been described as using temperature and/or moisture sensors to control a heater 12. However, it is to be understood that the method of the present invention can be applied to control any high current load 12 based upon at least one predetermined condition that is sensed by any type of sensor.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A method of controlling a load dependent upon at least one predetermined condition, said method comprising the steps of:
   providing at least one sensor;
   determining a presence of the at least one predetermined condition with said at least one sensor;
   transmitting a signal from said at least one sensor to an electrical processor dependent upon said determining step;
   controlling a switch device with said electrical processor dependent upon the signal from the at least one sensor, said switch device having a first state in which said switch device connects a power source to the load, and a second state in which said switch device connects said power source to each of said at least one sensor, said electrical processor and a rechargeable energy storage device;
   if said predetermined condition is not present, maintaining said switch device in said second state while said predetermined condition is not present; and
   if said predetermined condition is present, cyclically and continuously switching said switch device between said first state and said second state while said predetermined condition is present, said cyclical and continuous switching occurring at at least one predetermined frequency, said rechargeable energy storage device temporarily supplying power to each of said at least one sensor and said electrical processor when said switch device is in said first state, said power source recharging said rechargeable energy storage device when said switch device is in said second state.

2. The method of claim 1, comprising the further step of regulating a discharge current of said energy storage device to a substantially constant level while said switch device is in said first state.

3. The method of claim 2, wherein the regulation of the discharge current is performed at least in part by a shunt regulator.

4. The method of claim 3, wherein the regulation of the discharge current is also performed by a current-limiting resistor.

5. The method of claim 1, wherein:
   if said predetermined condition is not present, said power source is not connected to the load when said switch device is in said second state; and
   if said predetermined condition is present, power is applied to each of the load, said at least one sensor, said electrical processor and said rechargeable energy storage device when said switch device is in said second state.

6. The method of claim 5, comprising the further steps of:
   providing a thermal contactor configured for selectively interconnecting said power source and the load; and
   maintaining said connection between said power source and the load through said thermal contactor throughout said cyclical switching while said predetermined condition is present.

7. The method of claim 6, wherein said thermal contactor interconnects said power source and the load when an internal temperature within said thermal contactor is above a first predetermined temperature, said thermal contactor disconnecting said power source from the load when said internal temperature is below a second predetermined temperature, said maintaining step including the substeps of:
   heating said thermal contactor with an electrical current flowing from said power source; and choosing said at least one predetermined frequency and said time ratio such that said internal temperature within said thermal contactor exceeds said first predetermined temperature and remains above said second predetermined temperature.

8. The method of claim 1, wherein, during said cyclical switching, a ratio of time in which said switch device is in said first state to time in which said switch device is in said second state is approximately between 10:1 and 30:1.

9. The method of claim 8, wherein said at least one predetermined frequency and said time ratio are chosen such that said energy storage device is capable of supplying at least a minimum operating voltage to each of said at least one sensor and said electrical processor for an indefinite period of time throughout said cyclical switching while said predetermined condition is present.

10. The method of claim 8, wherein said at least one predetermined frequency is approximately between 0.5 Hz and 5 Hz.

11. The method of claim 1, wherein said at least one predetermined condition comprises at least one of an ambient temperature being below a predetermined temperature and a presence of moisture.

12. The method of claim 1, wherein said at least one predetermined frequency is a fixed frequency set by said electrical processor, said predetermined frequency being independent of all voltage levels and current levels outside of said electrical processor.

13. An apparatus for controlling application of electrical power from a power source to a load, said apparatus comprising:

a switch device having a first state in which said switch device is configured for connecting the power source to the load, and a second state in which said switch device is configured for connecting the power source to a terminal; and a control circuit electrically connected to said terminal, said control circuit comprising:

at least one sensor configured for sensing a presence of at least one predetermined condition and transmitting a signal indicative thereof;

an electrical processor configured for controlling said switch device dependent upon said signal from said at least one sensor, said electrical processor being configured for maintaining said switch device in said second state if and while said predetermined condition is not present, said electrical processor being configured for cyclically and continuously switching said switch device between said first state and said second state if and while said predetermined condition is present, said cyclical and continuous switching occurring at at least one predetermined frequency; and a rechargeable energy storage device configured for temporarily supplying power to each of said at least one sensor and said electrical processor when said switch device is in said first state, said rechargeable energy storage device being configured for being recharged by the power source when said switch device is in said second state.

14. The apparatus of claim 13, wherein said control circuit includes a shunt regulator configured for regulating a discharge current of said energy storage device to a substantially constant level while said switch device is in said first state.

15. The apparatus of claim 14, wherein said control circuit includes a current-limiting resistor configured for regulating said discharge current of said energy storage device to said substantially constant level while said switch device is in said first state.

16. The apparatus of claim 13, further comprising a thermal contactor configured for selectively interconnecting the power source and the load.

* * * * *